Aug. 19, 1941.   C. W. MICHAELS   2,253,341
MILKING MACHINE VALVE MECHANISM
Filed Jan. 9, 1939   2 Sheets-Sheet 1
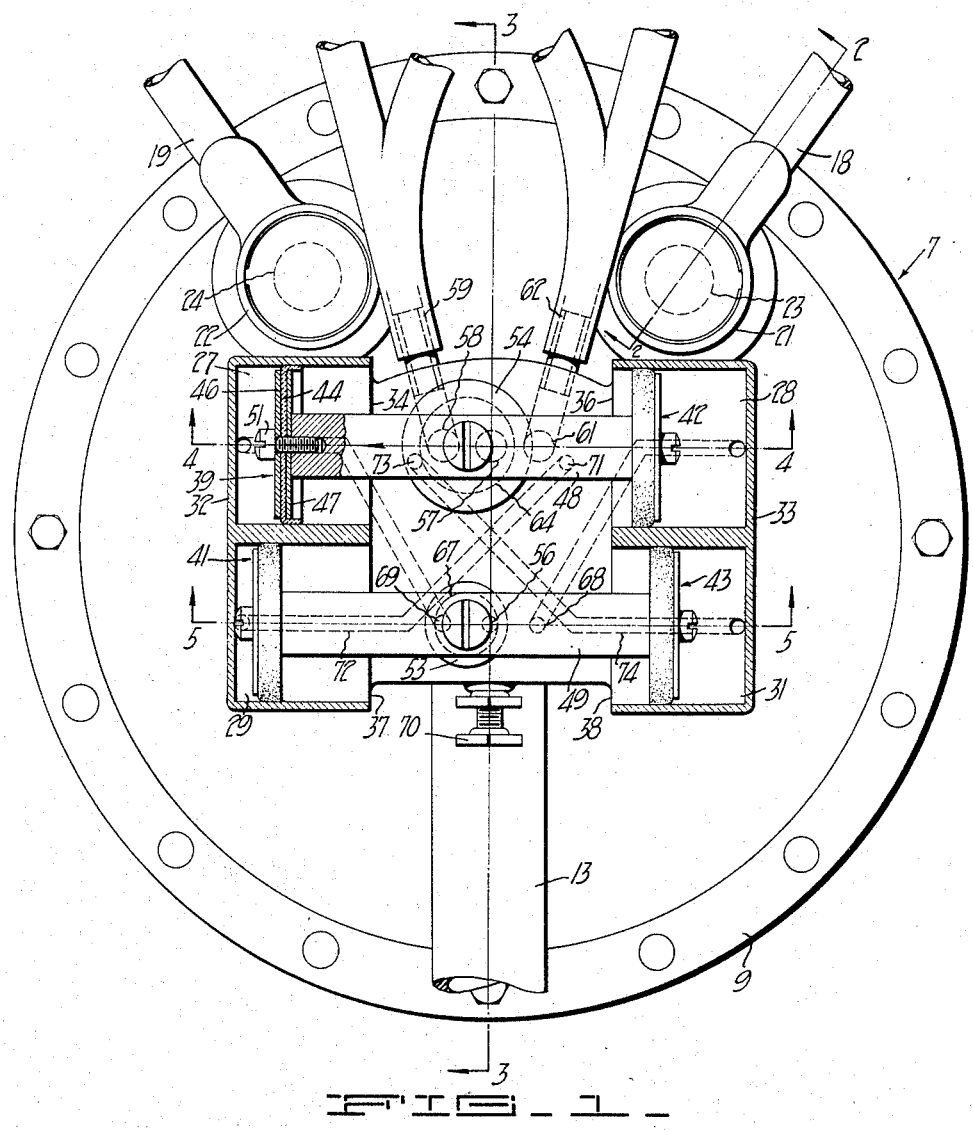
FIG_1_
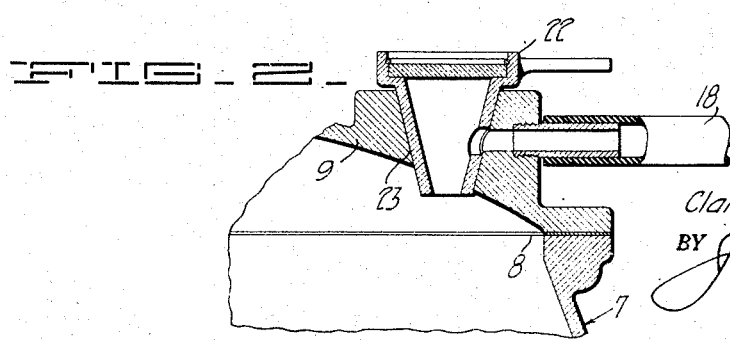
FIG_2_
INVENTOR.
Clarence W. Michgels
BY Joseph B. Gardner
ATTORNEY Aug. 19, 1941.  C. W. MICHAELS  2,253,341
MILKING MACHINE VALVE MECHANISM
Filed Jan. 9, 1939   2 Sheets-Sheet 2
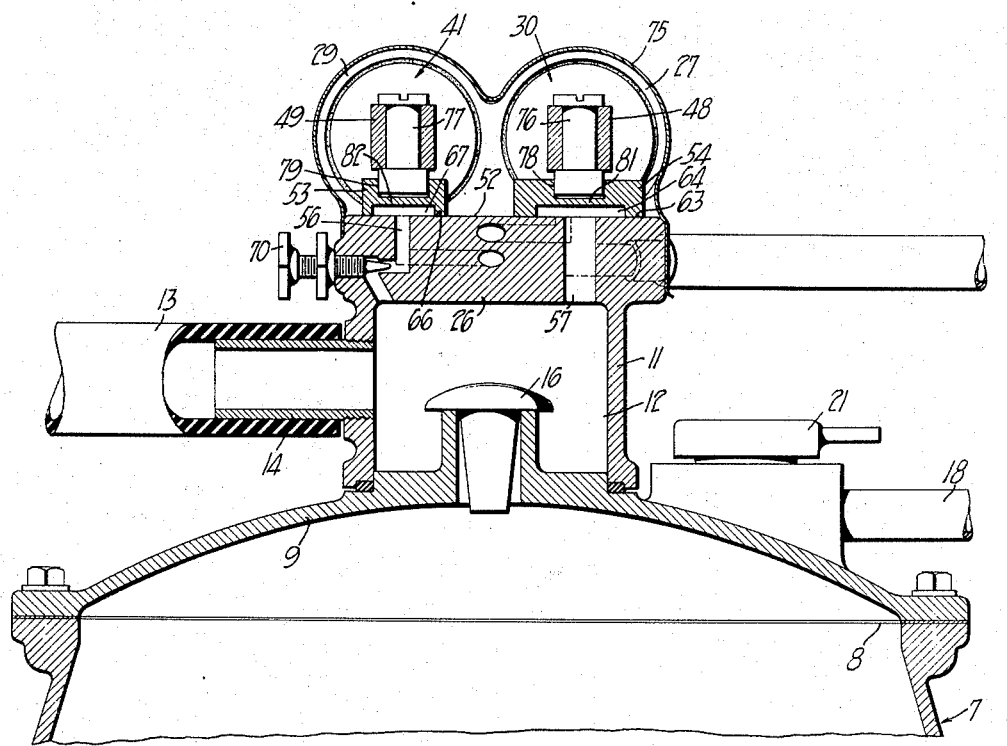
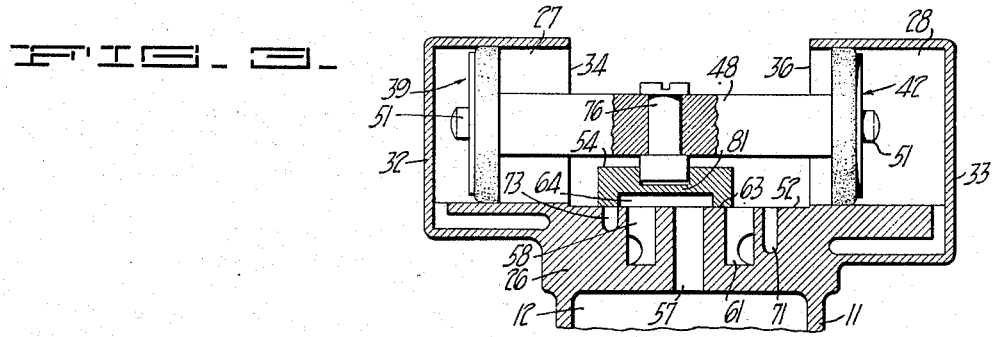
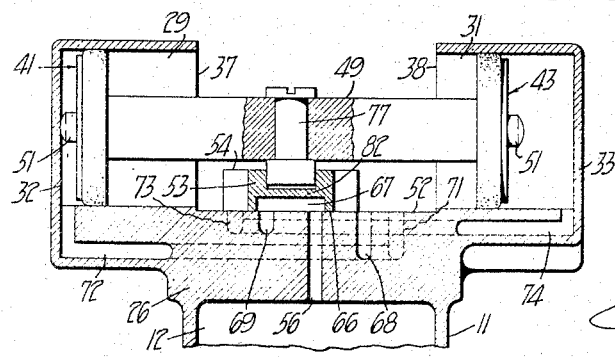
INVENTOR.
Clarence W. Michaels
BY Joseph B. Gardner
ATTORNEY Patented Aug. 19, 1941

2,253,341

UNITED STATES PATENT OFFICE 2,253,341

MILKING MACHINE VALVE MECHANISM

Clarence W. Michaels, Oakland, Calif.

Application January 9, 1939, Serial No. 249,872

4 Claims. (Cl. 31—62)

The invention relates to a milking machine of the vacuum operated pulsating type and relates more particularly to the valve mechanism and motive means therefor used by the milking machine.

An object of the invention is to provide a valve and motive unit for a vacuum milking machine of the character described which will operate with substantially reduced friction than similar types of mechanisms heretofore and will provide an improved sealing of the valve mechanism.

Another object of the invention is to provide a milking machine valve mechanism of the character described which is of a sliding valve type of construction and in which the sliding parts are so arranged as to provide a substantially improved bearing surface and one which will maintain a good seal for a substantially indefinitely long period of time and will require little or no attention or repairs throughout its full life of operation.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a plan view of a milking machine with a part of the valve mechanism shown in horizontal section.

Figure 2 is a fragmenary vertical sectional view taken substantially on the plane of line 2—2 of Figure 1.

Figure 3 is a vertical sectional view taken substantially on the plane of line 3—3 of Figure 1.

Figure 4 is a vertical sectional view of part of the valve mechanism taken substantially on the plane of line 4—4 of Figure 1.

Figure 5 is a vertical sectional view of another part of the valve mechanism taken substantially on the plane of line 5—5 of Figure 1.

The milking machine valve mechanism of the present invention consists briefly of a sliding type valve having a flat bearing surface provided with a plurality of ports adapted for connection to a source of vacuum or reduced pressure and a plurality of sets of teat cups, and a valve slidably mounted on said surface and adapted on movement thereover to cover and uncover certain of said ports in a manner providing for the alternate connection of the source of vacuum and the atmosphere to the teat cups for causing a pulsating operation thereof. As an important feature of the present invention, the sliding valve part is so mounted that the same may freely rotate as the same slides over the flat bearing surface containing the ports, whereby the valve may constantly orient its position in following the line of least resistance to constantly provide a good bearing seat on the flat valve surface. In this manner the sliding parts wear evenly and uniformly throughout their full life and any repair or resurfacing of the parts is reduced to a minimum. As another feature of the present invention, the valve is floatingly supported on the bearing surface so that the same is free to move to and from the surface and in accordance with the present arrangement is held against the surface by means of a constantly applied vacuum.

Referring more specifically to the accompanying drawings, the milking machine therein depicted comprises a container 7 having an open upper end 8 on which is mounted a cover plate 9. Mounted centrally on the upper side of the cover plate is a casing 11 providing a vacuum chamber 12 which is retained at a reduced pressure by connection to a suitable source of vacuum which is here effected by means of a conduit 13 connected to the chamber 12 through one side thereof by means of a fitting 14. A self-opening check-valve 16 is provided in a passage 17 communicating the chamber 12 with the interior of the container 7, whereby the chamber is retained at a reduced pressure. The valve 16 as here shown is adapted to close upon an increase of pressure in the chamber 12 over that in the container 7, so as to retain the reduced pressure in the container. Milk is led directly into the container 7 from the teat cups (not shown) by way of conduits 18 and 19 connected through manually operated valves 21 and 22 to milk inlet passages 23 and 24 in the cover plate 9, the arrangement here shown being designed for receiving milk from two sets of teat cups.

As is well understood in the art, the teat cup of the milking machine is operated by applying a constant vacuum to a center flexible tube of the teat cup for removing the milk and by alternately connecting a chamber surrounding the flexible tube with a source of vacuum and the atmosphere, so as to cause a pulsation of the flexible tube for milking the cow. Accordingly some means is provided for supplying the teat cup with a pulsating fluid such as air alternately connected to a source of vacuum and the atmosphere and in accordance with the present arrangement, such means is embodied in the form of a valve mechanism and an automatic motive unit therefor which is assembled directly on the top wall 26 of the casing 11. This valve and motive unit comprises opposed pairs of cylinders 27, 28 and 29, 31, the cylinders 27 and 29 being arranged in side by side relation and in axial alignment with cylinders 28 and 31. Cylinders 27 and 29 are here formed with a common end wall 32, and cylinders 28 and 31 are provided with a common end wall 33, such end walls being at the opposite ends of the mechanism, thereby disposing the open ends 34 and 36 of cylinders 27 and 28 facing each other and the open ends 37 and 38 of cylinders 29 and 31 similarly facing each other. Mounted for reciprocation in the cylinders are a plurality of pistons 39, 41, 42 and 43, each being similarly formed of a flexible packing gland 44 such as leather and the like, which is supported between a pair of reinforcing plates 46 and 47 and the whole assembly secured to an end of a pair of connecting rods 48 and 49, such as by means of a screw 51. In this manner pistons 39 and 42 are connected together for joint movement by means of a connecting rod 48, while pistons 41 and 43 are connected together for joint movement by means of a connecting rod 49.

As will be seen from the accompanying drawings, the axes of the several cylinders and the lines of movement of the pistons and connecting rods are arranged in parallel relation to a flat top surface 52 provided on the casing top wall 26. This latter surface, or more specifically that portion of the surface underlying part of the connecting rod, is used as one of the bearing surfaces of a slide valve, and slidably supports a pair of valve members 53 and 54 carried by the rods 49 and 48. The valve members 53 and 54 are connected to substantially the centers of the connecting rods, and directly underlying the valve in the center position thereof is a pair of passages 56 and 57 which extend through the wall 36 to the interior of the vacuum chamber 12. Spaced longitudinally at one side of passage 57 is a passage port 58 which extends into the body of the wall 26 and laterally to a side thereof, where the same is connected to a fitting 59 adapted for receipt of flexible conduits for connecting the passages to the aforementioned outer chambers of the teat cups. At an opposite longitudinal side of the vacuum port 57 is a passage port 61 which opens to the surface 52 and extends downwardly into the body of wall 26 and laterally to a second fitting 62 adapted for connection to conduits extending to a second set of teat cups. In accordance with the present construction, the under-side 63 of valve 54 is provided with a concavity 64 which in one position of the valve will simultaneously engage over and communicate ports 57 and 58, while uncovering port 61 to the atmosphere, and will in a second longitudinal position simultaneously engage over ports 57 and 61 while uncovering port 58 to the atmosphere, thereby providing an alternate connection of each of passages 58 and 61 to the vacuum source and to the atmosphere for producing a desired pulsating action. Since it is usually deemed preferable to apply opposite milking actions to the cow teats, I prefer to use Y-type fittings at 59 and 62 so that the opposite pulsating action obtained in the passages 58 and 61 may be applied to the cow's udder.

In accordance with the present construction, a second sliding valve construction is provided on the connecting rod 49 for controlling the movement of the first valve mechanism. This second valve mechanism includes the valve 53 which is formed at its under-side 66 with a concavity 67 which is adapted in one position to simultaneously engage over the vacuum passage 56 and a longitudinally spaced port 68 which extends into the body of the wall 26 and then laterally and upwardly to the outer end of cylinder 28. In an opposite longitudinal position of the rod 49 the concavity 67 simultaneously engages over and communicates with the vacuum port 56 and communicates with a port 69 opening to the surface 52 and which extends into the body of the wall 26 and laterally and into the outer end of cylinder 27. In this manner when the valve 53 is in its first mentioned position, the connecting rod 48 will be moved from left to right as viewed in Figure 1, and when in its second named position, the connecting rod 48 will be moved from right to left. Means for so displacing the rod 49 between the two aforesaid positions of valve 53 here involves the communication of vacuum port 57 of the first mentioned valve to the opposite ends of cylinders 29 and 31. This is effected by providing a passage port 71 adjacent to the port 61, so that the port 71 is simultaneously covered with port 61 by valve 54, and connecting such port by means of a lateral passage 72 in the body of the wall 26 to an end of the cylinder 29. Similarly, a port 73 is provided adjacent the port 58 and is communicated by a lateral passage 74 to the outer end of cylinder 31.

A manually operated valve 70 is preferably disposed in passage 56 for regulating the fluid flow therethrough for controlling the speed of operation of the pistons 39 and 42 in cylinders 27 and 28 and the corresponding rate of movement of the valve 54. A spring cover plate 75 may be mounted as here shown over the central portion of the valve mechanism between the cylinders 27, 28, 29 and 31 so as to prevent dust or the like from depositing on the working parts of the valve mechanism.

In accordance with the present invention, and as an important feature of the valve mechanism, the valves 53 and 54 are supported to enable a free rotation of the valves during their sliding reciprocal movement, whereby the valve lip at the under-sides 63 and 66 of the valve surrounding the cavities 64 and 67, may orient its position during movement relative to the flat bearing surface 52 for constantly providing a proper seating of the valve on the surface 52. I have found that by so mounting the valve a substantially perfect seal is constantly obtained throughout the life of the machine, without requiring any substantial attention or repair. While as will be understood, the valve members 53 and 54 are held against the surface 52 by reason of the constant communication of the vacuum ports 56 and 57 into the chambers 67 and 64, I have arranged for a floating support of the valve members to enable their movement normal to the surface 52, while being carried in their reciprocating movement. As here shown, the rotating and floating support for the valve members 53 and 54 is provided by pivotally securing the valve members to the rods 48 and 49 along axes normal to the surface 52 and permitting a limited movement of the valve members to and from the surface 52 along such axes. As will be best seen from Figures 3, 4 and 5, the rods 48 and 49 are provided with depending pins 76 and 77 of cylindrical form and with their axes substantially normal to the surface 52. The valve members 53 and 54 are provided with cylindrical bearing recesses 78 and 79 which are journaled on the pins 76 and 77 respectively, and are of a depth sufficient to normally space the bottom walls 81 and 82 from the lower ends of the pins, so as to enable an upward movement of the valve members 53 and 54.

In accordance with the above arrangement, the recesses 64 and 67 are of such form and size as to appropriately overlie the above-described sets of ports in all of the rotated positions of the valve members 53 and 54. To this end I prefer to form the cavities 64 and 67 of cylindrical form concentric to the pivotal axes of the valve members or at least to provide the cavities with circular open portions concentric to such axes. In this manner the overlying area of the cavities is unchanged in the various rotated positions of the valve members.

I claim:

1. In a valve and motive unit for a vacuum pulsator milking machine which comprises pairs of opposed cylinders, pistons reciprocally mounted therein, and rods connecting opposed pistons to cause the same to move in pairs, a plate mounted below and in spaced relation to said rods and having passages connected to said cylinders adapted for connection to a source of reduced pressure and to teat cups and opening to the top side of said plate, pins mounted on and depending from the central portion of said rods, and valve means for providing the alternate connection of said source and atmosphere to said cylinders to cause a reciprocation of said pistons and rods and an alternate connection of said source and atmosphere to said teat cups to cause a pulsation thereof and comprising, inverted cup shaped valves slidably supported on said plate for movement to cover and uncover certain of said passages and being pivotally engaged by said pins on said rods about vertical central axes of the valves to carry said valves in a rectilinear movement and for permitting a rotating movement of said valves about said pins and a sliding movement across the surface of said plate.

2. In a milking machine valve mechanism which comprises, a pair of aligned opposed cylinders, pistons mounted for rectilinear reciprocation therein, and a member connected between the central portions of each pair of opposed pistons for joint movement of each pair of pistons, a valve plate underlying said pistons and member and having a flat surface in a plane parallel to the lines of movement of said members and being provided with a plurality of passage ports opening to said surface being adapted for connection to a source of vacuum and a teat cup, a downwardly extending pin mounted on each of said members centrally between said pistons and having a cylindrical end portion, a pair of cylindrical valve members each having a central journal adapted to receive said cylindrical end portion of one of said pins for free rotatable attachment of a valve to each of said first members for rectilinear movement therewith and having an end face slidably engaged on said surface, said end face having a concavity therein for simultaneously overlying and communicating certain of said ports and being movable with said first members to cover and uncover certain of said ports, said valve members being pivoted to said first members coaxially of said valve members to permit rotation of the latter during sliding movement over said plate.

3. In a milking machine valve mechanism which comprises, a cylinder, a piston mounted therein for rectilinear reciprocal movement, means for alternately connecting said cylinder to a source of vacuum and the atmosphere for reciprocating said piston, and a piston rod, a cylindrical pin mounted on said rod and spaced from said piston, a bearing plate having a flat bearing surface parallel to the movement of said piston and rod and formed with a plurality of passages opening to said surface and being adapted for connection to a source of vacuum and to a milking machine teat cup, a valve member having a journal adapted to receive said pin to secure said valve member to said rod for rectilinear movement therewith and having the side slidably supported on said surface, said side having a concavity therein for simultaneously overlying and communicating certain of said passages and being movable with said rod to cover and uncover certain of said passages, said valve member being pivoted to said rod along an axis normal to said bearing surface to permit rotation of said valve member during sliding movement thereof.

4. In a milking machine valve mechanism which comprises, a cylinder, a piston mounted therein for reciprocal rectilinear movement, means for alternately connecting said cylinder to a source of vacuum and the atmosphere for reciprocating said piston, and a piston rod, a bearing plate having a flat bearing surface parallel to the movement of said piston and rod and formed with a plurality of passages opening to said surface and being adapted for connection to a source of vacuum and to a milking machine teat cup, a valve member, means connecting said valve member to said rod for rectilinear movement therewith and comprising, a bearing pin carried by said rod normal to said surface, said valve member having a bearing recess journaled on said pin and having an opposite side slidably supported on said surface, said valve side being provided with a recess adapted to engage over and communicate certain of said passages and on movement of said valve member to cover and uncover certain of said passages, the engagement of said pin and bearing recess being such as to provide free rotational movement of said valve member about said pin and free movement longitudinally of said pin to and from said surface.

CLARENCE W. MICHAELS.